Jan. 12, 1943.   D. P. MacDONALD   2,307,840
TRAINING APPARATUS
Filed May 25, 1942   3 Sheets-Sheet 2
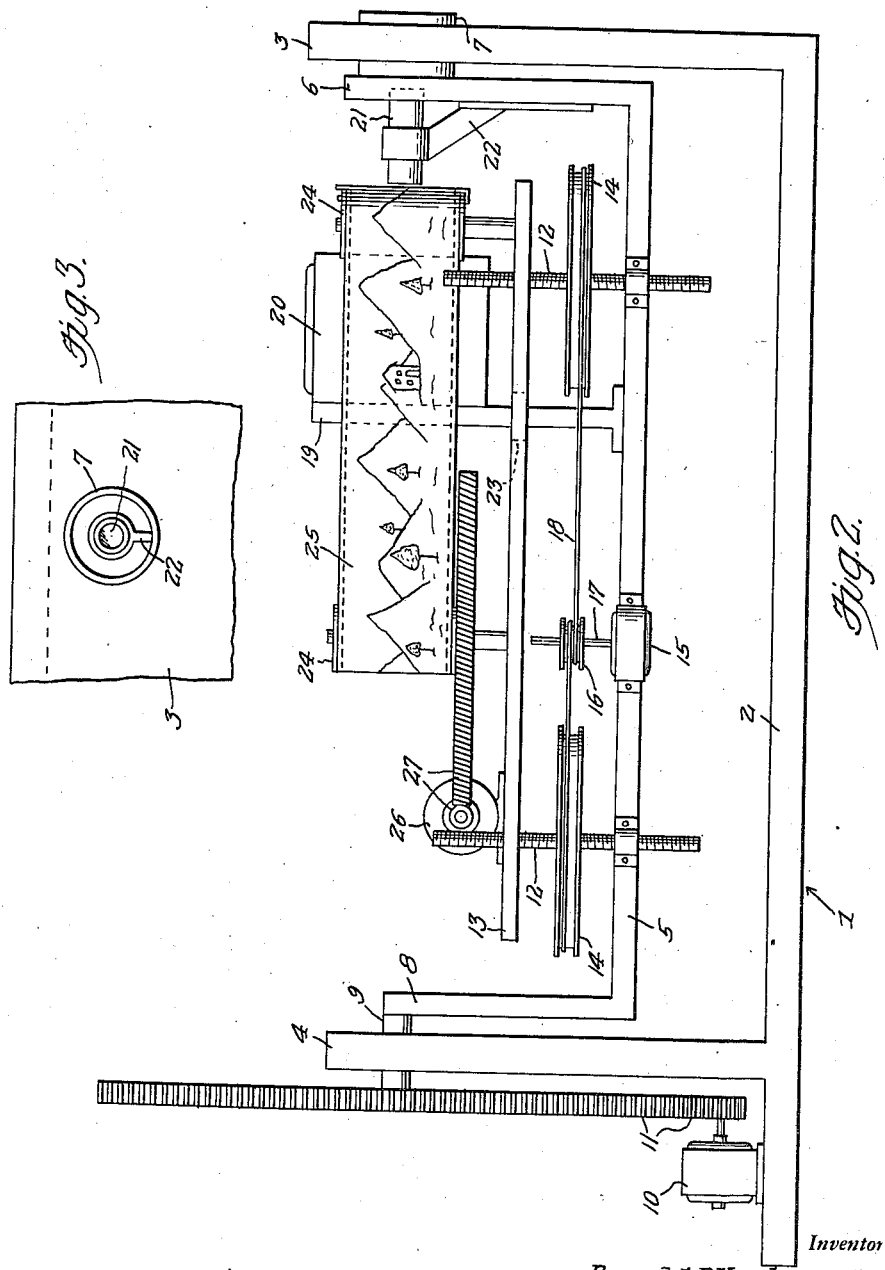
Inventor
Donald P. Macdonald.
By Clarence A. O'Brien
and Harvey B. Jacobson, Attorneys Jan. 12, 1943.    D. P. MacDONALD    2,307,840
TRAINING APPARATUS
Filed May 25, 1942    3 Sheets-Sheet 3
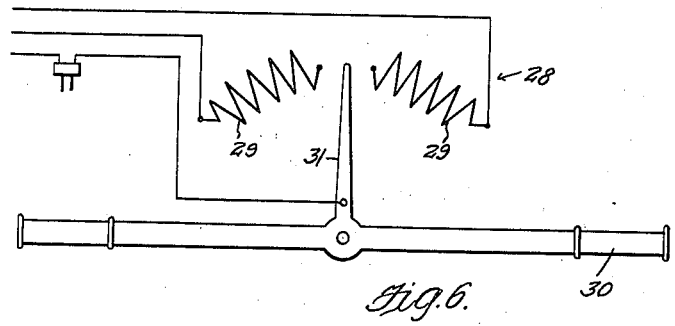
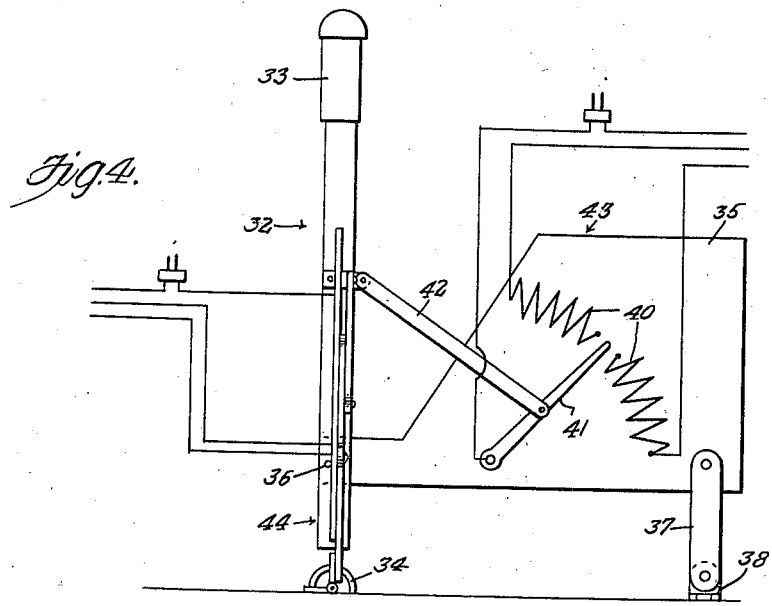
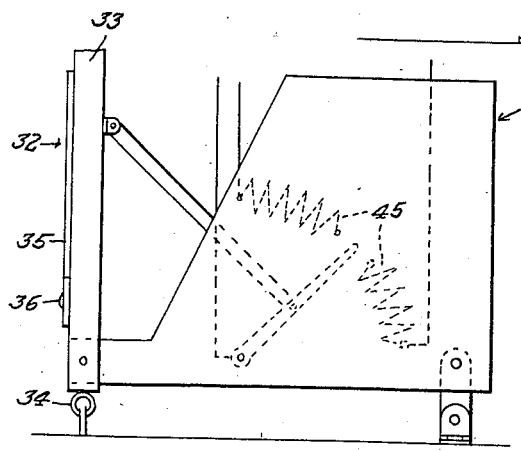
Inventor
Donald P. Macdonald,
By Clarence A. O'Brien
and Harvey B. Jacobson
Attorneys Patented Jan. 12, 1943

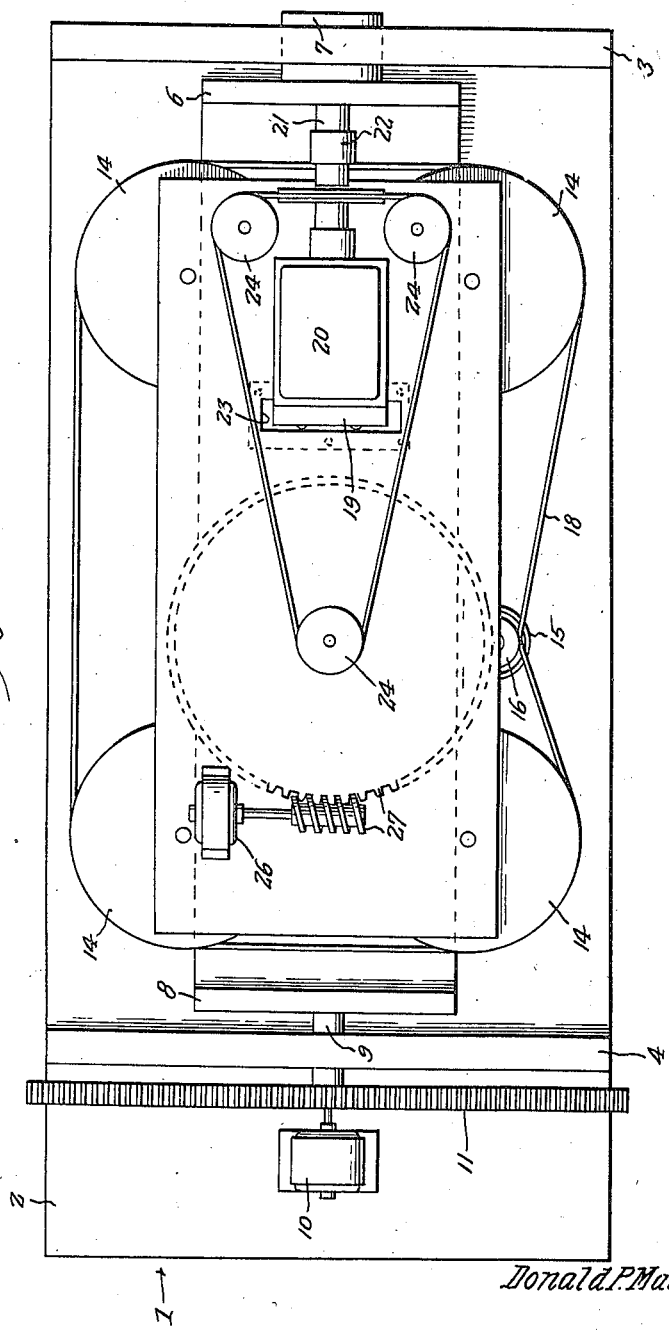

2,307,840

UNITED STATES PATENT OFFICE 2,307,840

TRAINING APPARATUS

Donald Peart MacDonald, San Francisco, Calif.

Application May 25, 1942, Serial No. 444,441

5 Claims. (Cl. 35—12)

The present invention relates to new and useful improvements in training apparatus, particularly for student airplane pilots, and has for its primary object to provide, in a manner as hereinafter set forth, novel means for aiding the student in learning to coordinate his muscular movements with the observed conditions of flight, as reproduced by the controlled movement of a scene projected on a screen from a film.

Another very important object of the invention is to provide a flight training apparatus of the aforementioned character comprising means closely simulating the controls of an airplane for controlling the movement of the projected scene.

Other objects of the invention are to provide a training apparatus of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a training apparatus constructed in accordance with the present invention.

Figure 2 is a view in side elevation thereof.

Figure 3 is a fragmentary view in front elevation.

Figure 4 is a diagrammatic view of the hand control.

Figure 5 is a diagrammatic view of the hand control, taken at right angles to Figure 4.

Figure 6 is a diagrammatic view of the foot control.

Referring now to the drawings in detail, it will be seen that the embodiment of the apparatus which has been illustrated comprises a supporting structure which is designated generally by reference numeral 1. The supporting structure 1 includes a base 2 of suitable material from which uprights 3 and 4 rise.

Mounted for swinging movement in a vertical plane between the uprights 3 and 4 of the supporting structure 1 is a carriage 5. The front end portion 6 of the swinging carriage 5 has fixed therein and projecting therefrom a tubular trunnion 7 which is journaled in an opening provided therefor in the upright 3. The rear end portion 8 of the swinging carriage 5 has fixed thereon a trunnion 9 in the form of a stub shaft which is journaled in and extends through the rear upright 4 of the supporting structure 1. A reversible electric motor 10 is mounted on the rear end portion of the base 2. Reduction gears 11 connect the electric motor 10 to the trunnion 9 for actuating the swinging carriage 5.

Posts 12 are mounted for vertical adjustment on the carriage 5. A platform 13 is mounted for vertical adjustment on the posts 12. The posts 12 include oppositely threaded end portions between which pulleys 14 are fixed on said posts. It will be observed that one end of the posts 12 are threadedly connected to the carriage 5 and the other end portions of said posts are threadedly connected to the platform 13. Also mounted on the carriage 5 is a reversible electric motor 15. A pulley 16 is splined on the armature shaft 17 of the motor 15. An endless cable or belt 18 is wound around the pulley 16 and trained around the pulleys 14 for connecting the posts 12 to the electric motor 15 for actuation in unison thereby, thus raising or lowering the platform 13.

Fixed on the carriage 5 and rising therefrom is a bracket 19. A suitable projector 20 is mounted on the bracket 19. An end lens 21 is fixedly secured through the medium of a bracket 22 on the front end portion 6 of the carriage 5 for projecting a light beam through the tubular trunnion 7 to a screen (not shown) from the projector 20. An opening 23 in the platform 13 accommodates the bracket 19.

A plurality of vertical spools 24 are rotatably mounted on the platform 13. An endless panorama film 25 is trained around the spools 24, said film passing through the beam of light between the projector 20 and the lens 21. A reversible electric motor 26 on the platform 13 drives the rear spool 24 through reduction gears 27 for moving the endless film 25.

A switch 28 controls the reversible electric motor 26. The switch 28 comprises resistance contacts 29 which are electrically connected to opposite sides of the motor 26. The switch 28 further includes a foot rudder bar 30 which is pivotally mounted at an intermediate point and which has fixed thereon a movable contact 31 which is engageable selectively with the stationary resistance or rheostat contacts 29. Thus, by controlling the reversible motor 26, the speed and direction of movement of the endless film 25 may be regulated as desired.

In Figures 4 and 5 of the drawings, a hand control unit for the electric motors 10 and 15 is designated generally by reference numeral 32. The unit 32 includes a stick 33 which is mounted in any suitable manner for universal swinging movement, as at 34. A plate 35 of insulating material has one end pivotally connected at 36 to the lower portion of the stick 33. A link 37 supports the other end of the plate 35 for swinging movement with the stick 33 when said stick is swung laterally. In the embodiment shown, a hinge 38 to which the lower end of the link 37 is connected permits swinging movement of the plate 35 with the stick 33 when said stick is swung forwardly and rearwardly. Resistances or rheostats 40 are mounted on the plate 35. A movable contact 41 is mounted on the plate 35 for engagement with either of the rheostats 40. A rod 42 connects the movable contact 41 to the stick 33 for actuation thereby upon lateral swinging movement of said stick. The rheostats 40 are electrically connected to opposite sides of the motor 10. Thus, a switch 43 is provided for controlling the electric motor 10.

The unit 32 further comprises a switch 44 for controlling the electric motor 15. The switch 44 is substantially similar to the switch 43 with the exception that it is arranged and connected to the stick 33 for actuation thereby when said stick is swung forwardly and rearwardly. The rheostats 45 of the switch 44 are electrically connected to the opposite sides of the motor 15.

It is thought that the operation of the apparatus will be readily apparent from a consideration of the foregoing. Briefly, with the projector 20 in operation, the motor 26 is actuated through the medium of the foot controlled switch 28 for moving the endless film 25. Of course, the panorama on the film 25 is projected onto the hereinbefore mentioned screen. By actuating the rudder bar 30 in either direction with the feet, thus engaging the swinging contact 31 with either of the rheostats 29, the speed and direction of the reversible electric motor 26 may be regulated as desired for moving the endless film 25 in either direction at any suitable speed. This conveys to the student or other observer the visual effect of a right or left turn. If the stick 33 is moved forwardly the electric motor 15 is actuated, through the switch 44, in a direction to raise the platform 13 with the film 25 thereon relative to the projector 20 and the lens 21. In this manner the horizon of the scene in the screen is caused to move upwardly, giving the illusion of a downward movement or dive to the student. The reverse of this, or the climbing effect, may be had by pulling the stick 33 rearwardly, thereby reversing the electric motor 15 and lowering the platform 13 with the film 25 thereon. When the film 25 is moved downwardly the horizon of the scene on the screen also moves downwardly. The illusion of banking may be had by swinging the stick 33 laterally in either direction. When this is done, the motor 10 swings the carriage 5 with the platform 13 and the film 25 thereon for tilting the picture on the screen. The construction, combination and arrangement is such that any desired effect, or combinations of effects, may be had.

An advantage of the apparatus over devices for a generally similar purpose in use at present is that at no time is it necessary to shift the student's center of balance in order to produce the illusion of motion. Thus, the apparatus more closely resembles the actual conditions of flight wherein the pilot's center of balance is maintained in a stationary position in relation to the plane due to the centrifugal force acting on him.

It is believed that the many advantages of a flight training apparatus constructed in accordance with the present invention will be readily understood, and although a preferred embodiment of said apparatus is as illustrated and described, it is to be understood that changes in the details of construction and in the combination and arrangement of parts may be resorted to which will fall within the scope of the invention as claimed.

What is claimed is:

1. A training apparatus of the character described comprising, in combination, a supporting structure, a photographic film movably mounted on said supporting structure, a projector mounted on the supporting structure and associated with the film for projecting a picture therefrom to a screen, means for actuating the film in opposite directions, and means for raising and lowering said film relative to the projector.

2. A training apparatus comprising, in combination, a supporting structure, motion picture projecting means mounted on said supporting structure, and means for swinging the motion picture projecting means in opposite directions on the supporting structure for tilting a picture from said projecting means on a screen.

3. A training apparatus of the character described comprising, in combination, a supporting structure, a picture projector mounted on the supporting structure, an endless picture film movably mounted on the supporting structure and associated with the projector, means for actuating the film in opposite directions and for controlling the speed of movement thereof, means for raising and lowering the film relative to the projector, and means for swinging the film and the projector in unison in a vertical plane for tilting the picture from said film relative to the screen.

4. A training apparatus of the character described comprising a supporting structure, a cradle mounted for swinging movement in a vertical plane on said supporting structure, means for swinging the cradle in opposite directions, a platform mounted on the carriage for adjustment toward and away from said carriage, means for adjusting the platform relative to the carriage, a projector mounted on the carriage, and endless picture film mounted on the platform and associated with the projector, and means for moving the film in opposite directions.

5. A training apparatus of the character described comprising a support, a plurality of posts threadedly mounted for vertical adjustment on said support, a platform threadedly mounted on said posts, means for rotating the posts in unison for adjusting the platform toward or away from the support, a picture projector mounted on the support, an endless picture film mounted on the platform and associated with the projector, and means on the platform for actuating the film in opposite directions.

DONALD P. MACDONALD.